Patented Mar. 21, 1944

2,344,830

UNITED STATES PATENT OFFICE 2,344,830

COMPOSITION OF MATTER FOR THE CHEMICAL FIXATION OF DISEASED TISSUE PREPARATORY FOR SURGICAL REMOVAL

Frederic E. Mohs, Madison, Wis., assignor to Wisconsin Alumni Research Foundation, Madison, Wis., a corporation of Wisconsin No Drawing. Application August 15, 1940, Serial No. 352,811

1 Claim. (Cl. 167—63)

This invention relates to a preparation or instrumentality which is applied to the surface or area of diseased tissue for the purpose of carrying to said tissue drugs or chemicals for killing and fixing the diseased tissue, in the preparation for, or the conditioning of said diseased tissue for removal by surgery. This instrumentality is not intended as, nor is it used as, a cure or remedy for diseased tissue. The object of the invention is to provide an instrumentality for chemically fixing or conditioning the diseased tissue so as to prepare the tissue for removal by excision. Many drugs and chemicals, which are hereinafter referred to as the active tissue fixing agents, can be used in preparing diseased tissue for surgical removal, and the purpose of this invention is to provide an instrumentality for carrying the active agent to the tissue and accurately controlling the depth or penetration thereof into the tissue. The effectiveness or efficiency of the surgical procedure is directly related to the penetration or permeation of the active agent. My invention provides a means of controlling or regulating the depth of permeation or penetration of the active agent into the tissue, and of confining the active agent accurately to the area to which it is applied.

This object is accomplished by incorporating the active agent in a vehicle or carrying base which, when applied to the affected area, has properties which act to release or discharge a predetermined or known quantity of the active agent so that control or regulation of the depth of permeation or penetration is obtained by varying the thickness or depth of the layer or film of the vehicle applied to the tissue.

In accordance with this invention, the preparation into which the active agent is incorporated, is in the form of a plastic mass or body so that it can be applied to the tissue as a paste in a layer or film of the desired depth or thickness. It is, however, of such consistency that it is not affected by body heat or pressure from dressings, hence it does not flow or spread beyond the margins of the area on which it is applied; thus accurate control of the area of application is obtained.

The vehicle or base is composed of two components which I have termed the agglutinant and the permeant for the purpose of designating the classes of materials having the properties or characteristics necessary for the proper functioning of the preparation. The agglutinant provides (1) the property of adhesion whereby to hold the preparation in proper contact with the tissue; (2) the property of cohesion whereby the permeant particles are held together giving body to the preparation; and (3) the property of affinity for the solution of the active agent whereby the solution is prevented from separating from the plastic mass. The agglutinants I have found satisfactory are organic substances. Those I have successfully used are of plant origin, namely, *Sanguinaria canadensis*, *Circuma longa*, *Podophyllum peltatum*, *Phytolacca decandra*, and *Inula helenium*. There are other materials that may be used such as *Hydrastis canadensis*, *Glycyrrhiza glabra*, starch and wheat flour, but these are less favorable in imparting adhesiveness and body to the mass.

The permeant has the property of imparting a capillary structure to the mixture or preparation and, in combination with the agglutinant, of providing body, cohesiveness and plasticity to the mass. The permeant may be any of a variety of substances having the following characteristics or properties: (1) granular in form and of such size as, for instance, passes through 80 to 200 mesh sieves; (2) insoluble in a solution of the active agent; (3) preferably a specific gravity of 4.0 or more; (4) unreactive with the active agent; (5) color, preferably dark, to impart contrast between the preparation and the tissues enabling easy visualization.

I have found a large number of substances that have these properties and may be used as permeants, such as limonite, stibnite, emery, pyrolusite, ferric oxide (brown preferred over red), hematite, and iron lactate.

The mixture of the agglutinant and permeant in proper proportions imparts to the resulting mass the essential properties of (1) low affinity for the active agent and (2) high permeability throughout the mass.

The affinity of the base for the active agent is inversely proportioned to the quantity of permeant. Thus the proportionate amount of permeant can be regulated so that the base will have just sufficient affinity for the active agent solution to prevent its settling to the bottom of a container and yet have a sufficiently loose hold on the solution to permit its easy passage from the applied mass into the tissues being treated.

The high permeability of the base varies in direct proportion with the amount of permeant. The capillary structure imparted to the preparation by multiple interfaces supplied by the permeant has the function of increasing permeability thus permitting the passage of the active agent from all levels of even very thick applications of the preparation. This enables regulation of penetration over a wide range of depths by simply altering the depth of application.

In preparing the composition, the agglutinant and permeant are preferably first mixed together and then a solution (usually saturated) of the active agent is added in quantity sufficient to bring the mass to the desired degree of plasticity.

It is important that correct relative proportions of permeant and agglutinant be used. For example, if the relative amount of agglutinant is increased beyond a rather sharply defined point, there will be a tendency for the material to harden, rendering it useless after standing several days or weeks. On the other hand, if the amount of agglutinant is decreased beyond a certain point, the preparation lacks "body," and it will tend to squeeze out from under the dressing, flow onto uninvolved areas, and render the depth of penetration of the active agent uncertain. Furthermore, the solution of the active agent will tend to settle out of the mass to the bottom of the container.

An example of a composition in which zinc chloride is the active agent, stibnite is the permeant, and *Sanguinaria canadensis* is the agglutinant, in the proper proportions, is as follows:

Stibnite (Thompson-Hayward) _____ gm__ 40.0
*Sanguinaria canadensis* _____ gm__ 10.0
Zinc chloride, saturated solution (4:1) __cc__ 34.5

The zinc chloride constitutes 45.2% of the total weight in this preparation.

The following table indicates the depth of penetration in mm. of zinc chloride into all tissues except (1) tissues containing keratin; e. g. normal skin and keratinized squamous cell carcinomas, (2) neoplasms containing melanin, e. g. nevi and melanomas, and (3) tissue containing osseous material, e. g. normal bone or osteoma or osteosarcoma, the preparation used being that of the formula which is given immediately above.

*Diameter of area in cm.*

| | 0.3 | 0.5 | 1.0 | 1.5 | 2.0 | 3.0 | 5.0 | 10.0 |
|---|---|---|---|---|---|---|---|---|
| 0.1 | 1.0 | 1.2 | 1.5 | 1.9 | 2.1 | 2.2 | 2.3 | 2.3 |
| 0.3 | 1.2 | 1.4 | 2.0 | 2.4 | 2.9 | 3.2 | 3.5 | 3.6 |
| 0.5 | 1.4 | 1.6 | 2.4 | 3.2 | 3.8 | 4.0 | 4.2 | 4.3 |
| 0.8 | 1.7 | 1.9 | 2.9 | 3.9 | 4.5 | 4.7 | 4.9 | 5.0 |
| 1.0 | 1.9 | 2.2 | 3.4 | 4.4 | 5.1 | 5.4 | 5.6 | 5.7 |
| 1.5 | 2.1 | 2.8 | 5.0 | 5.6 | 6.4 | 6.9 | 7.3 | 7.7 |
| 2.0 | 2.4 | 3.2 | 6.3 | 7.0 | 7.8 | 8.5 | 9.0 | 9.4 |
| 3.0 | 2.6 | 3.5 | 7.0 | 8.0 | 8.7 | 9.3 | 9.7 | 10.0 |

Depth or thickness of applied layer in mm.

In the following table are examples of compositions of various agglutinants and permeants in which zinc chloride (saturated solution) was incorporated as the active agent, the proportions being indicated:

Examples of the same vehicle or base in which other active agents are incorporated, are as follows:

Stibnite (Thompson-Hayward) _____ gm__ 8.0
*Sanguinaria canadensis* _____ gm__ 4.0
Antimony chloride, saturated solution__cc__ 4.6

Stibnite (Foote) _____ gm__ 8.0
*Sanguinaria canadensis* _____ gm__ 2.0
Mercuric chloride _____ gm__ 4.0
Water _____ cc__ 5.0

Stibnite (Thompson-Hayward) _____ gm__ 8.0
*Sanguinaria canadensis* _____ gm__ 8.0
Phenol _____ cc__ 13.5

Stibnite (Thompson-Hayward) _____ gm__ 8.0
*Sanguinaria canadensis* _____ gm__ 6.0
Arsenic trioxide, saturated solution ___ cc__ 15.5

Stibnite (Thompson-Hayward) _____ gm__ 10.0
*Sanguinaria canadensis* _____ gm__ 5.0
Sulfanilamide powder _____ gm__ 3.0
Glycerine _____ cc__ 2.0
Water _____ cc__ 13.0

Stibnite (Thompson-Hayward) _____ gm__ 10.0
*Sanguinaria canadensis* _____ gm__ 5.0
Thymol _____ gm__ 3.2
Water _____ cc__ 14.0

The use of the preparation as a means by which a known amount or quantity of active agent can be applied to tissue to be treated, and the extent to which it penetrates the tissue can be controlled, is particularly desirable in the field of chemosurgery wherein the ultimate removal of the diseased tissue is accomplished by surgery, for the reason that the operator is enabled to accurately determine the exact extent of the growth of and destroy the diseased tissue preparatory to removal by excision. For instance, in connection with the removal of cancer by excision, the diseased tissue is first killed and fixed by the action of the preparation which is applied to the surface. The penetration of the active agent under a given set of conditions is controlled by the thickness of the applied layer of the preparation. If the cancer is covered by skin, it is desirable to use a strong keratolytic such as dichloracetic acid to dissolve the surface layer of keratin which would otherwise act as a barrier to the passage of the active agent of the preparation.

The applied preparation is covered by a suitable dressing. After a period of about twenty-four hours the treated tissue will have become fixed to the predetermined depth and is then excised with surgical instruments. The next step is the examination of this removed tissue, and since the tissue has been fixed by the chemical

| | *Sanguinaria canadensis* (Allaire-Woodward) | *Circuma longa* (Penick) | *Podophyllum peltatum* (Penick) | *Phytolacca decandra* (Penick) | *Inula helenium* (Penick) |
|---|---|---|---|---|---|
| Stibnite (Meyer) | 4:1 | 4:1 | 4:1 | 4:1 | 4:1 |
| Stibnite (Thompson-Hayward) | 4:1 | 4:1 | 4:1 | 4:1 | 4:1 |
| Stibnite (Foote) | 4:1 | 4:1 | 4:1 | 4:1 | 4:1 |
| Limonite (Shook & Fletcher) | 16:1 | 16:1 | 16:1 | 16:1 | 16:1 |
| Emery (U. W. Stock) | 8:1 | 8:1 | 8:1 | 8:1 | 8:1 |
| Pyrolusite (French Battery) | 32:1 | 16:1 | 32:1 | 32:1 | 32:1 |
| Pyrolusite (U. W. Stock) | 32:1 | 16:1 | 32:1 | 32:1 | 32:1 |
| Hematite (Wisconsin) | 16:1 | 16:1 | 16:1 | 16:1 | 16:1 |
| Ferric oxide (Baker-brown) | 32:1 | 32:1 | 32:1 | 32:1 | 32:1 |
| Ferric oxide (Merck-red) | 32:1 | 32:1 | 32:1 | 32:1 | 32:1 | treatment it may be immediately prepared for microscopic examination by freezing with carbon dioxide and cutting into five to forty micra slices on the microtome. These slices are then mounted on slides, stained by the haematoxylin and eosin method, cleared and covered with a coverslip floated on balsam.

Examination under the microscope of the slides so prepared reveals the presence or absence of cancerous tissue. If cancer is thus revealed, the area is again treated by a layer of the preparation and controlled as to depth as before. Another layer of tissue is then removed, prepared and examined. These procedures are repeated daily until all of the irregularities, downgrowths, and outgrowths as well as the main mass of cancer have been removed. This is accomplished by dividing up the removed layer into convenient specimens and drawing a map of each specimen in relation to body landmarks, thus locating the sub-areas of affected tissue. The specimens are then laid flat on the freezing microtome so that a plane through the deepest part of each specimen is cut. By this method it is thus possible to examine microscopically every square millimeter of the area under suspicion. If cancerous areas are then revealed by this examination, each area thus affected is similarly treated to fix the tissue, a layer is removed, examined, and the treatment repeated until the growth is completely removed.

Thus the complete cancer can be located and removed with the minimum of normal tissue destruction.

I claim:

A composition of matter for use in fixing predetermined depths of diseased tissue preparatory to removal of said tissue by excision, comprising in proportion stibnite, approximately 40.0 gm., *Sanguinaria canadensis* 10.0 gm., zinc chloride, saturated solution (4:1), 34.5 cc., the said mixture being in the form of a plastic mass of paste consistency capable of being applied to the tissue as a layer of given thickness.

FREDERIC E. MOHS.